(12) United States Patent
Dozier et al.

(10) Patent No.: US 10,547,698 B2
(45) Date of Patent: Jan. 28, 2020

(54) DYNAMIC CHARACTERIZATION OF NODES IN A SEMANTIC NETWORK FOR DESIRED FUNCTIONS SUCH AS SEARCH, DISCOVERY, MATCHING, CONTENT DELIVERY, AND SYNCHRONIZATION OF ACTIVITY AND INFORMATION

(75) Inventors: Linda T. Dozier, Great Falls, VA (US); Edmund J. Fish, Great Falls, VA (US); Miles R. Gilburne, Washington, DC (US); Nina Zolt, Washington, DC (US)

(73) Assignee: Cricket Media, Inc., McLean, VA (US)

( * ) Notice: Subject to any disclaimer, the term of this patent is extended or adjusted under 35 U.S.C. 154(b) by 187 days.

(21) Appl. No.: 11/937,495

(22) Filed: Nov. 8, 2007

(65) Prior Publication Data
US 2009/0070490 A1 Mar. 12, 2009

Related U.S. Application Data

(60) Provisional application No. 60/857,570, filed on Nov. 8, 2006, provisional application No. 60/857,560, filed
(Continued)

(51) Int. Cl.
*H04L 29/08* (2006.01)
*G06F 16/90* (2019.01)
(Continued)

(52) U.S. Cl.
CPC .............. *H04L 67/22* (2013.01); *G06F 16/90* (2019.01); *G06Q 10/06* (2013.01); *G06Q 30/02* (2013.01);
(Continued)

(58) Field of Classification Search
CPC ......... Y10S 707/99933; G06F 17/3069; G06F 17/30176; G06T 15/005; G06T 15/30;
(Continued)

(56) References Cited

U.S. PATENT DOCUMENTS

| 4,740,912 A | 4/1988 | Whitaker |
| 5,710,884 A | 1/1998 | Dedrick |

(Continued)

FOREIGN PATENT DOCUMENTS

| EP | 1338966 A2 | 8/2003 |
| FR | 2814844 A1 | 10/2000 |

(Continued)

OTHER PUBLICATIONS

International Search Report & Written Opinion dated Jun. 18, 2008 by the International Searching Authority for copending international application No. PCT/US2007/84189.
(Continued)

*Primary Examiner* — Viet D Vu
(74) *Attorney, Agent, or Firm* — Nelson Mullins Riley & Scarborough LLP

(57) ABSTRACT

The present invention provides a system of computers on a wide area network that establishes connections between nodes on the basis of their multidimensional similarity at a particular point in time in a certain setting, such as a social learning network, and sends relevant information to the nodes. Dimensions in the definition of similarity include a plurality of attributes in time and community space. Examples of such dimensions and attributes may include a position in a learning community's project cycle, titles of readings and projects, the genre or subject matter under consideration, age, grade or skill level of the participants, and language. The network's nodes are represented as a vector of attributes and are searched efficiently and adaptively through a variety of multidimensional data structures and mechanisms. The system includes synchronization that can transform a participant's time attributes on the network and coordinate the activities and information for each participant.

9 Claims, 1 Drawing Sheet

Related U.S. Application Data on Nov. 8, 2006, provisional application No. 60/857,583, filed on Nov. 8, 2006.

(51) Int. Cl.
| | |
|---|---|
| *G09B 19/22* | (2006.01) |
| *G06Q 30/02* | (2012.01) |
| *G06Q 30/08* | (2012.01) |
| *G06Q 10/06* | (2012.01) |
| *G06Q 50/00* | (2012.01) |
| *H04L 29/06* | (2006.01) |
| *H04L 12/24* | (2006.01) |

(52) U.S. Cl.
CPC .............. *G06Q 30/08* (2013.01); *G06Q 50/01* (2013.01); *G09B 19/22* (2013.01); *H04L 41/0893* (2013.01); *H04L 65/403* (2013.01)

(58) Field of Classification Search
CPC ... H04L 41/145; H04L 43/0811; H04L 47/10; H04L 63/1416; H04W 84/18
USPC ....... 709/243, 241, 239, 233, 223, 222, 200, 709/250, 238, 231, 229, 224, 230, 249; 370/401, 400, 395.21, 380, 351, 328, 255, 370/254, 252, 244, 238, 242, 217, 221; 715/841, 763, 745, 738, 733, 255, 239, 715/236, 210; 726/23
See application file for complete search history.

(56) References Cited

U.S. PATENT DOCUMENTS

| | | | |
|---|---|---|---|
| 5,740,549 A | 4/1998 | Reilly et al. | |
| 5,761,662 A | 6/1998 | Dasan | |
| 5,768,528 A | 6/1998 | Stumm | |
| 5,772,446 A | 6/1998 | Rosen | |
| 5,813,863 A | 9/1998 | Sloane et al. | |
| 5,907,831 A | 5/1999 | Lotvin et al. | |
| 5,933,498 A | 8/1999 | Schneck et al. | |
| 5,970,231 A | 10/1999 | Crandall | |
| 5,972,875 A | 10/1999 | Crutcher et al. | |
| 5,974,446 A | 10/1999 | Sonnenreich et al. | |
| 5,987,606 A | 11/1999 | Cirasole et al. | |
| 6,020,884 A | 2/2000 | MacNaughton et al. | |
| 6,029,195 A * | 2/2000 | Herz ................ | G06F 17/30867 |
| | | | 348/E7.056 |
| 6,075,968 A | 6/2000 | Morris et al. | |
| 6,085,229 A | 7/2000 | Newman et al. | |
| 6,105,027 A | 8/2000 | Schneider et al. | |
| 6,157,924 A | 12/2000 | Austin | |
| 6,178,407 B1 | 1/2001 | Lotvin et al. | |
| 6,208,995 B1 | 3/2001 | Himmel et al. | |
| 6,233,618 B1 | 5/2001 | Shannon | |
| 6,249,282 B1 | 6/2001 | Sutcliffe et al. | |
| 6,279,013 B1 | 8/2001 | LaMarca et al. | |
| 6,296,487 B1 | 10/2001 | Lotecka | |
| 6,302,698 B1 | 10/2001 | Ziv-El | |
| 6,324,538 B1 | 11/2001 | Wesinger, Jr. et al. | |
| 6,341,960 B1 | 1/2002 | Frasson et al. | |
| 6,363,062 B1 | 3/2002 | Aaronson et al. | |
| 6,370,355 B1 | 4/2002 | Ceretta et al. | |
| 6,374,237 B1 | 4/2002 | Reese | |
| 6,381,444 B1 | 4/2002 | Aggarwal et al. | |
| 6,401,075 B1 | 6/2002 | Mason et al. | |
| 6,438,632 B1 | 8/2002 | Kikugawa | |
| 6,460,036 B1 | 10/2002 | Herz | |
| 6,470,353 B1 | 10/2002 | Yaung et al. | |
| 6,480,885 B1 | 11/2002 | Olivier | |
| 6,554,618 B1 | 4/2003 | Lockwood | |
| 6,560,578 B2 | 5/2003 | Eldering | |
| 6,658,415 B1 | 12/2003 | Brown et al. | |
| 6,684,212 B1 | 1/2004 | Day et al. | |
| 6,691,106 B1 | 2/2004 | Sathyanarayan | |
| 6,691,153 B1 | 2/2004 | Hanson et al. | |
| 6,704,320 B1 * | 3/2004 | Narvaez et al. ............. | 370/408 |
| 6,718,369 B1 | 4/2004 | Dutta | |
| 6,725,203 B1 | 4/2004 | Seet et al. | |
| 6,741,980 B1 | 5/2004 | Langseth et al. | |
| 6,757,691 B1 | 6/2004 | Welsh et al. | |
| 6,766,362 B1 | 6/2004 | Miyasaka et al. | |
| 6,807,558 B1 | 10/2004 | Hassett et al. | |
| 6,825,945 B1 | 11/2004 | Silverbrook et al. | |
| 6,826,534 B1 | 11/2004 | Gupta et al. | |
| 6,842,773 B1 | 1/2005 | Ralston et al. | |
| 6,845,273 B1 | 1/2005 | Taylor | |
| 6,892,226 B1 | 5/2005 | Tso et al. | |
| 6,920,617 B2 | 7/2005 | Nitta | |
| 6,954,783 B1 | 10/2005 | Bodwell et al. | |
| 6,973,462 B2 | 12/2005 | Dattero et al. | |
| 6,988,839 B1 | 1/2006 | Yu | |
| 7,031,651 B2 | 4/2006 | McCormick et al. | |
| 7,032,022 B1 | 4/2006 | Shanumgam et al. | |
| 7,035,926 B1 | 4/2006 | Cohen et al. | |
| 7,120,590 B1 | 10/2006 | Eisen et al. | |
| 7,127,741 B2 | 10/2006 | Bandini et al. | |
| 7,162,522 B2 | 1/2007 | Adar et al. | |
| 7,328,216 B2 | 2/2008 | Hofmann et al. | |
| 7,464,147 B1 | 12/2008 | Fakhouri et al. | |
| 7,577,665 B2 | 8/2009 | Ramer et al. | |
| 7,640,336 B1 | 12/2009 | Lu et al. | |
| 7,765,481 B2 | 7/2010 | Dixon et al. | |
| 7,881,315 B2 * | 2/2011 | Haveson ............. | H04L 12/2812 |
| | | | 370/401 |
| 9,620,028 B2 | 4/2017 | Dozier et al. | |
| 9,928,753 B2 | 3/2018 | Dozier et al. | |
| 2001/0037407 A1 | 11/2001 | Dragulev et al. | |
| 2002/0013836 A1 | 1/2002 | Friedman et al. | |
| 2002/0038246 A1 | 3/2002 | Nagaishi | |
| 2002/0040374 A1 | 4/2002 | Kent | |
| 2002/0049806 A1 | 4/2002 | Gatz et al. | |
| 2002/0064767 A1 | 5/2002 | McCormick et al. | |
| 2002/0100808 A1 | 8/2002 | Norwood et al. | |
| 2002/0119434 A1 | 8/2002 | Beams et al. | |
| 2002/0123334 A1 | 9/2002 | Borger et al. | |
| 2002/0140732 A1 | 10/2002 | Tveskov | |
| 2002/0161770 A1 | 10/2002 | Shapiro et al. | |
| 2002/0169782 A1 | 11/2002 | Lehmann et al. | |
| 2002/0169954 A1 | 11/2002 | Bandini et al. | |
| 2002/0174230 A1 | 11/2002 | Gudorf et al. | |
| 2002/0184092 A1 | 12/2002 | Cherry et al. | |
| 2003/0029911 A1 | 2/2003 | Kitayama | |
| 2003/0050986 A1 | 3/2003 | Matthews et al. | |
| 2003/0093518 A1 | 5/2003 | Hiraga | |
| 2003/0110215 A1 | 6/2003 | Joao | |
| 2003/0164849 A1 | 9/2003 | Barrie et al. | |
| 2003/0207245 A1 | 11/2003 | Parker | |
| 2003/0227479 A1 * | 12/2003 | Mizrahi .................. | A63F 13/10 |
| | | | 715/753 |
| 2004/0001087 A1 | 1/2004 | Warmus et al. | |
| 2004/0014017 A1 | 1/2004 | Lo | |
| 2004/0030781 A1 | 2/2004 | Etesse et al. | |
| 2004/0039814 A1 | 2/2004 | Crabtree et al. | |
| 2004/0049554 A1 | 3/2004 | Watanabe | |
| 2004/0064515 A1 | 4/2004 | Hockey | |
| 2004/0103118 A1 | 5/2004 | Irving et al. | |
| 2004/0103122 A1 | 5/2004 | Irving et al. | |
| 2004/0103137 A1 | 5/2004 | Irving et al. | |
| 2004/0111423 A1 | 6/2004 | Irving et al. | |
| 2004/0122692 A1 | 6/2004 | Irving et al. | |
| 2004/0128624 A1 | 7/2004 | Arellano et al. | |
| 2004/0145770 A1 | 7/2004 | Nakano et al. | |
| 2004/0165536 A1 * | 8/2004 | Xu | |
| 2004/0167794 A1 | 8/2004 | Shostack et al. | |
| 2004/0186738 A1 | 9/2004 | Reisman | |
| 2004/0205578 A1 | 10/2004 | Wolff et al. | |
| 2005/0014121 A1 | 1/2005 | Eck et al. | |
| 2005/0014122 A1 * | 1/2005 | Ruvinsky ................ | G09B 7/02 |
| | | | 434/350 |
| 2005/0033657 A1 | 2/2005 | Herrington et al. | |
| 2005/0071328 A1 | 3/2005 | Lawrence | |
| 2005/0079477 A1 | 4/2005 | Diesel et al. | |
| 2005/0105134 A1 | 5/2005 | Moneypenny et al. | |

(56) References Cited

U.S. PATENT DOCUMENTS

| | | | |
|---|---|---|---|
| 2005/0165743 | A1 | 7/2005 | Bharat et al. |
| 2005/0166143 | A1 | 7/2005 | Howell |
| 2005/0216336 | A1 | 9/2005 | Roberts et al. |
| 2005/0216556 | A1 | 9/2005 | Manion et al. |
| 2005/0227216 | A1 | 10/2005 | Gupta |
| 2005/0240580 | A1 | 10/2005 | Zamir et al. |
| 2005/0246211 | A1 | 11/2005 | Kaiser |
| 2005/0251494 | A1* | 11/2005 | Maria Jansen .................. 707/1 |
| 2005/0266388 | A1 | 12/2005 | Gross et al. |
| 2005/0288943 | A1 | 12/2005 | Wei et al. |
| 2006/0020662 | A1 | 1/2006 | Robinson |
| 2006/0031087 | A1 | 2/2006 | Fox et al. |
| 2006/0052057 | A1* | 3/2006 | Persson ............. H04M 1/72522 455/41.2 |
| 2006/0062157 | A1* | 3/2006 | Yamamoto ................... 370/254 |
| 2006/0089948 | A1 | 4/2006 | Picker et al. |
| 2006/0115800 | A1 | 6/2006 | Daley |
| 2006/0134593 | A1 | 6/2006 | Kalous et al. |
| 2006/0240856 | A1* | 10/2006 | Counts et al. ................ 455/518 |
| 2006/0242234 | A1 | 10/2006 | Counts et al. |
| 2006/0246197 | A1 | 11/2006 | Kshirsagar et al. |
| 2006/0248197 | A1* | 11/2006 | Evans et al. .................. 709/227 |
| 2006/0252547 | A1 | 11/2006 | Mizrahi et al. |
| 2006/0253533 | A1 | 11/2006 | Bursztein et al. |
| 2006/0253572 | A1 | 11/2006 | Gomez et al. |
| 2007/0027973 | A1 | 2/2007 | Stein et al. |
| 2007/0130339 | A1 | 6/2007 | Alcorn et al. |
| 2007/0224585 | A1 | 9/2007 | Gerteis et al. |
| 2007/0231782 | A1 | 10/2007 | Ozawa et al. |
| 2007/0245349 | A1 | 10/2007 | Sinn |
| 2007/0260671 | A1 | 11/2007 | Harinstein et al. |
| 2008/0005188 | A1* | 1/2008 | Li et al. ......................... 707/201 |
| 2008/0082480 | A1 | 4/2008 | Gounares et al. |
| 2008/0096519 | A1* | 4/2008 | Miegel .................. H04W 4/023 455/404.2 |
| 2008/0126476 | A1 | 5/2008 | Nicholas et al. |
| 2008/0176194 | A1 | 7/2008 | Zolt et al. |
| 2009/0030876 | A1 | 1/2009 | Hamilton |
| 2011/0016137 | A1 | 1/2011 | Goroshevsky et al. |
| 2014/0095619 | A1 | 4/2014 | Dozier et al. |
| 2014/0356839 | A1 | 12/2014 | Dozier et al. |
| 2017/0366633 | A1 | 12/2017 | Dozier et al. |

FOREIGN PATENT DOCUMENTS

| | | |
|---|---|---|
| JP | 2002288187 | 10/2002 |
| JP | 2001306606 | 11/2002 |
| JP | 2005128673 | 5/2005 |
| JP | 2006065734 | 9/2006 |
| WO | 2007118231 | 10/2007 |

OTHER PUBLICATIONS

U.S. Appl. No. 11/937,497, entitled "System for Developing Literacy Skills Using Loosely Coupled Tools in a Self-Directed Learning Process within a Collaborative Social Network," filed Nov. 8, 2007.
U.S. Appl. No. 11/937,499, entitled "Method and System for Developing Process, Project or Problem Based Learning Systems with a Semantic Collaborative Social Network," filed Nov. 8, 2007.
Ashley Lowery, Internet Neighborhood ePALS links world with Edwardsburg, South Bend Tribune, Mar. 14, 2001.
EPALS Classroom Exchange First to Provide Teacher Monitored Email With Instant Language Translations, PR Newswire, Mar. 14, 2000.
EPALS Classroom Exchange partners with Canada's SchoolNet, Canada NewsWire, Nov. 23, 2000.
MessageLabs: British Government Takes on MessageLabs to Bolster Virus Protection, M2 Presswire, May 16, 2002.
Netopia: Netopia to bring parental control, content filtering and family security services to broadband service providers, M2 Presswire, Jun. 4, 2002.
Portions of http://www.ecs.syr.edu/organizations/AEW/ website and associated Internet Archive information.
Safety: Monitoring web access, The Guardian, Oct. 25, 2000, at 7.
Scholastic and ePALS Classroom Exchange Announce Agreement Connecting Global Classrooms, Business Wire, Aug. 10, 2000.
Zoraini Wati Abas, E-mail activities in the classroom, Computimes Malaysia, Apr. 26, 2001.
Portions of the file history of European patent application No. EP 7871417.7.
Portions of the file history of Patent Cooperation Treaty (PCT) international patent application No. PCT/IB07/04578.
Portions of the file history of Patent Cooperation Treaty (PCT) international patent application No. PCT/US07/84189.
Portions of the file history of U.S. Appl. No. 11/937,497.
Portions of the file history of U.S. Appl. No. 11/937,499.
Portions of the file history of U.S. Appl. No. 13/251,263.
United States Patent and Trademark Office, Non-Final Office Action, dated Mar. 2, 2012, U.S. Appl. No. 13/251,263, filed Oct. 2, 2011, Linda T. Dozier et al.
United States Patent and Trademark Office, Non-Final Office Action, dated Apr. 17, 2012, U.S. Appl. No. 11/402,830, filed Apr. 13, 2006, Osmani Gomez et al.
Official Notice of Rejection dated Jan. 11, 2013 for Japanese Patent Application No. 2009-536506.
Ivan Cantador, et al.; "Multilayered Semantic Social Network Modeling by Ontology-Based User Profiles Clustering: Application to Collaborative Filtering", Jan. 1, 2006 (Jan. 1, 2006), Managing Knowledge in a World of Networks Lecture Notes in Computer Science; Lecture Notes in Artificial Intellig Ence; LNCS, Sringer, Berlin, DE, pp. 334-349, XP019045784.
Supplementary European Search Report Issued for EP Patent Application No. EP07871417 dated Feb. 12, 2013.
United States Patent and Trademark Office, Non-Final Office Action, dated Dec. 18, 2013, U.S. Appl. No. 13/251,263, filed Oct. 2, 2011, Linda Dozier, et al.
Japanese Patent Office, Notice of Rejection, dated Dec. 24, 2013, Japanese Application No. 2012-271707, filed Dec. 12, 2012, ePals, Inc.
Office Action dated Jul. 8, 2014 in U.S. Appl. No. 14/050,418, filed Oct. 10, 2013.
Response filed Apr. 24, 2014 to Notice of Rejection dated Dec. 24, 2013 in Japanese Application No. 2012-271707, filed Dec. 12, 2012.
Response filed Jun. 18, 2014 to Office Action dated Dec. 18, 2013 in U.S. Appl. No. 13/251,253, filed Oct. 2, 2011.
Response filed April 8, 2015 to Office Action dated Oct. 9, 2014 in U.S. Appl. No. 14/255,334, filed April 17, 2014.
Office Action dated May 6, 2015 in U.S Appl. No. 14/050,418, filed Apr. 17, 2014.
Office Action dated Oct. 9, 2014 in U.S. Appl. No. 14/255,334, filed Apr. 17, 2014.
Office Action dated Aug.26, 2014 in U.S. Appl. No. 11/937,499, filed Nov. 8, 2007.
Office Action dated Aug. 27, 2014 in U.S. Appl. No. 11/937,497, filed Nov. 8, 2007.
Office Action dated Dec. 10, 2014 in U.S. Appl. No. 13/251,263, filed Oct. 2, 2011.
Response filed Jan. 7, 2015 to Office Action dated Jul. 8, 2014 in U.S. Appl. No. 14/050,418, filed Oct. 10, 2013.
Office action dated Dec. 11, 2015 in U.S. Appl. No. 13/251,263, filed Oct. 2, 2011.
Office Action dated Jul. 28, 2017 in U.S. Appl. No. 11/937,499.

* cited by examiner

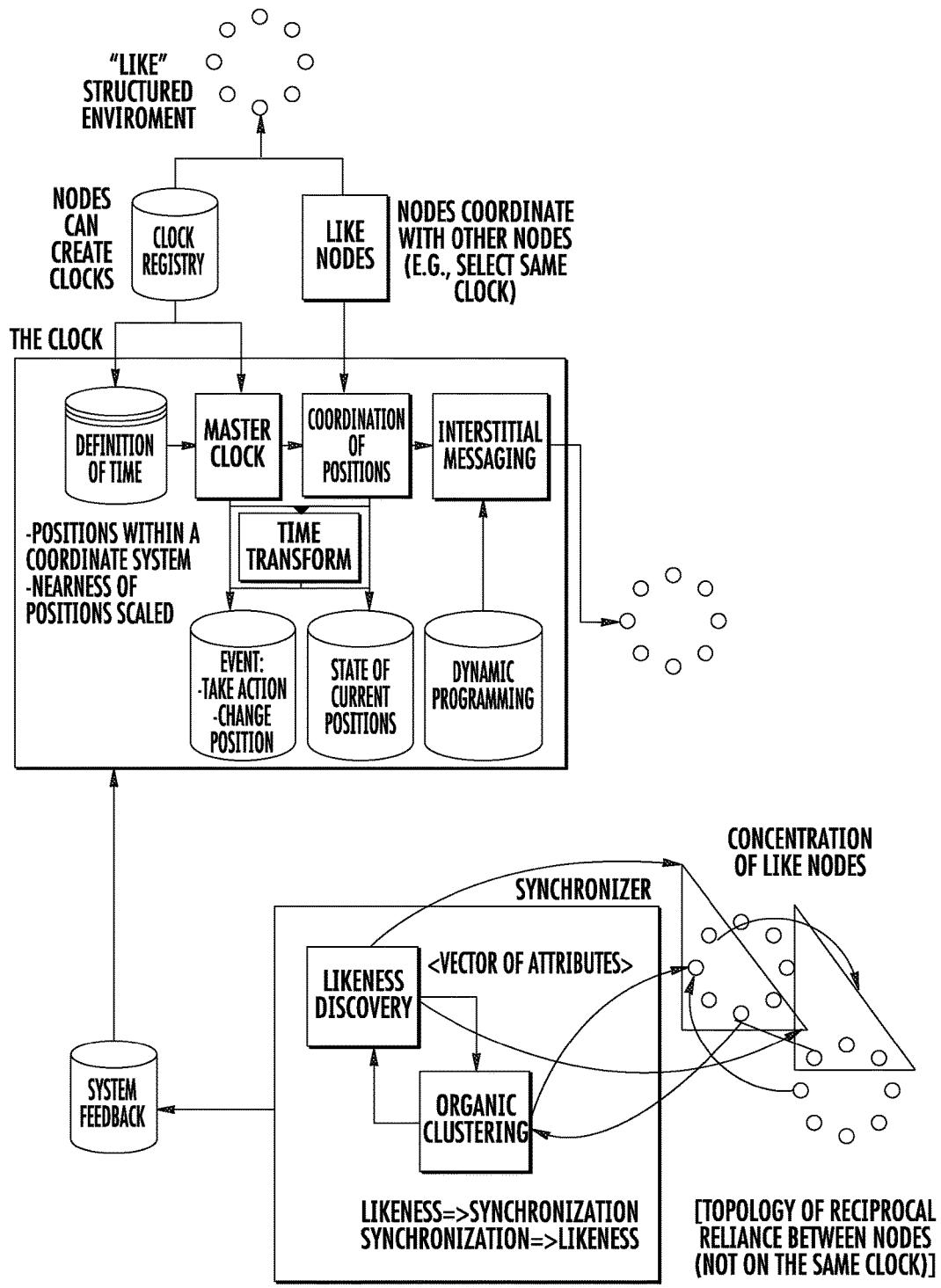

DYNAMIC CHARACTERIZATION OF NODES IN A SEMANTIC NETWORK FOR DESIRED FUNCTIONS SUCH AS SEARCH, DISCOVERY, MATCHING, CONTENT DELIVERY, AND SYNCHRONIZATION OF ACTIVITY AND INFORMATION

CLAIM OF PRIORITY

The present application claims the benefit of U.S. provisional applications Nos. 60/857,560; 60/857,570; and 60/857,583, all filed on Nov. 8, 2006 by Gilburne et al., the entire disclosures of which are incorporated by reference herein in their entirety.

FIELD OF THE INVENTION

This invention generally relates to networks, and more specifically, to determining similarity between nodes in a network.

BACKGROUND OF THE INVENTION

The connection between nodes in a network, using electronic means to interconnect the nodes, is based on a set of binary relationships. That is, either there is an arc connecting two nodes or there is not. If an arc is present, the distance between the nodes is one. The measurement between any two nodes is uniform, such that a node located between two other nodes is considered to be equally related to both regardless of the similarities or differences between the three. Such systems are unable to express similarity between nodes based on the distance between nodes as determined by pair-wise comparison of the attributes of the nodes. Moreover, such systems are unable to recalculate the distance (i.e., the similarity) between nodes based on dynamic redefinition of the relationship between the nodes or their attributes. Such systems are therefore unable to synchronize nodes in terms of their similarity or in terms of changes to the nodes' attributes based on events, actions, or states of and between the nodes. Such systems are also unable to discover or infer that a node is more or less similar to one node versus another given a set of constraints, and search for nodes that are similar or within a defined distance from each other.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 1 is a flowchart of an exemplary system for dynamically characterizing nodes in a semantic network and coordinating activities or information among them.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

While the invention may be used for a variety of purposes such as finding groups of similar nodes, making connections between nodes based on similarity, synchronizing the activity of nodes based on their similarity, and to make information available to similarly-situated nodes, one specific embodiment relates to a system and method of creating and operating a social learning network. For the purposes of this example and the present disclosure, copending patent application entitled "System for Developing Literacy Skills Using Loosely Coupled Tools in a Self-Directed Learning Process Within a Collaborative Social Network," filed simultaneously herewith and bearing application Ser. No. 11/937,497 is incorporated by reference herein in its entirety. The present system and method may be incorporated, in one embodiment, into the learning process within the collaborative social network described therein.

The present invention is a system and related method for dynamically characterizing nodes in a network and measuring the distance between them. The measured distance between two nodes identifies the similarities between the nodes based on one or more attributes of the nodes, which may be weighted such that one attribute is determined to be more important than another. The distance between two nodes is determined based on a type of relationship between the nodes' attributes identified from semantic or other information, rather than a binary relationship based on whether the value of an attribute of the first node matches the value of an attribute of the second node. In other words, the distance may be based on the degree of similarity between the values of each attribute of one node compared to the values of similar attributes of another node. The degree of similarity between the attribute values can be determined semantically or established from other information, such as a predefined set of relationship rules. As a result, the relationship between each attribute is not determined based on a connected-or-not state (i.e., whether the attribute values match), but on a degree of similarity between the values and attributes. The distance between nodes is dynamic, thereby changing depending on what attributes are defined as important for a given goal, or based on changes to the attributes themselves.

A node in the network, N, may be a user, software agent, machine, a process, or combinations of the foregoing; essentially any logical grouping that can serve as a locus for attributes, discovery, rules, processes, etc. Each node is characterized by a vector of attributes $$N = [x_1 \, x_2 \ldots x_n]$$

where, x values are the node's attributes that characterize the node, not coordinate points in the traditional sense. An attribute, such as $x_1$, is information that can be collected, either actively or passively, and associated with one or more nodes. Each node can be associated with an infinite amount of attributes, but not all attributes may contain a value for a specific node. An example of a subset of attributes that may be relevant to the presently-described embodiment of a social learning network may include rating, time, level of expertise, age, grade, current assignment, education level, subject-matter, interest, etc. Attributes of a node may be supplied directly or derived indirectly through analysis of the attributes of similar nodes or analysis of the attributes of a given node, at least in part for the purpose of associating other information with the node. For example, other nodes in a network may possess a common attribute that may be inferred to a specific attribute, or a node may have previously interacted with a number of other nodes, where such interaction may itself become an attribute. The values of the attributes are dynamic and can be updated based on the activities, interactions, or lack thereof between a node and other nodes in the network. In order to calculate the similarity between nodes using this dynamic set of attributes, the attributes of the node are represented as scalar values. That is, an attribute may be defined by a number of non-numerical values, such as "male" or "female" for a "gender" attribute for purposes of the current example. These non-numerical values are represented as scalar values, for example, "male" would receive the value of 2, while "female" would receive the value of 3 for the present example.

Thus, the attribute matrix described above for node N may be represented by a vector of scalar values, which represent values of the corresponding attributes. The scalar vector enables calculation of the similarity, or distance, between nodes by determining the difference of similar attributes. The difference between a specific attribute of two nodes is represented by the absolute value of the difference between the attributes, or $$|x_1 - x_1|$$

such that the first $x_1$ represents the scalar value of an attribute of one node, while the second $x_1$ represents the scalar value of a similar attribute of another node.

A measure of similarity, or distance, between two nodes is determined according to the formula:

$$(\Delta s)^2 = g_{11}(\Delta x_1)^2 + g_{12} \Delta x_1 \Delta x_2 + \ldots + g_{1n} \Delta x_1 \Delta_n +$$
$$g_{21} \Delta x_2 x_1 + g_{22}(\Delta x_2)^2 + \ldots + g_{nn}(\Delta x_n)^2$$
$$= \sum_{i=1}^{d} \sum_{j=1}^{d} g_{ij} \Delta x_i \Delta x_j$$

where d is the length of the x vectors (i.e., the number of attributes for the nodes) and g is a weighting factor for each attribute comparison as described in more detail below.

The measure of similarity between nodes can be used to discover, search, group, synchronize as to other nodes, time, other information, or a number of factors, or determine, at least in part, the delivery of content, such that the similarity calculated between two nodes may be used to suggest and provide action, activities, or information for use and/or consumption to similarly-situated nodes.

The invention allows the definition of which pairs of attributes are more important or less important when determining similarity between two nodes by providing a weight to each comparison of two attributes using the coefficient g. The coefficient g is a matrix where the number of rows and the number of columns are equal to the number of attributes $x_n$ of each node N, such that:

$$g = \begin{bmatrix} g_{11} & g_{12} & \cdots & g_{1a} \\ g_{21} & g_{22} & \cdots & g_{2a} \\ \vdots & \vdots & \vdots & \vdots \\ g_{b1} & g_{b2} & \cdots & g_{ab} \end{bmatrix}$$

where $g_{ab}$ is the weighting factor for the comparison between an attribute $x_a$ of a first node and an attribute $x_b$ of a second node. Thus, the coefficient g is a matrix of weighting factors that allows the system to define which comparison of attributes of two nodes are more important and which are less important when determining the distance, or overall similarity, between two nodes. The coefficient g also allows the measured similarity to be configured based on which attributes are important for a specific circumstance. Thus, another coefficient g may be used to measure the similarity between two nodes by applying a different weighting coefficient to a different set of attributes. For any coefficient g, a value of zero (0) at a specific location indicates that the comparison of the corresponding attribute of one node to a corresponding attribute of another node is unimportant for determining the similarity between the nodes based on the chosen set of attributes. Thus, the coefficient g may vary because some relationships are more important than others in determining whether two nodes are similar to each other for given circumstances. The weights established by the coefficient g may vary over time and may be specified as a defined input. In another embodiment, the weights provided by the coefficient g may be provided dynamically by a user who, for example, may be searching for similar nodes and choose to weight the comparison of attributes based on the user's desired goal. In yet a further embodiment, the system generates a coefficient g matrix based on a user's ranking of the similarity, or distance, between a set of nodes. In other words, the attributes for the set of nodes is known, and the user defines the distance between the nodes, thereby allowing the system to solve for the corresponding g matrix.

In another embodiment, a value of one (1) may be provided for all specific g values, thereby indicating that all attribute comparison should be weighted equally. In this embodiment, the g matrix may be removed from the above described equation.

In another embodiment, calculation of the distances between nodes may be pursuant to a search, such that the relevant attributes for the search are selected and criteria corresponding to the selected attributes are provided. A weight for the comparison of each of the desired attributes may also be provided. The search results are ordered based on the calculated distances and, if the number of attributes selected are less than 4, may be displayed graphically. The user may alter the relevant attributes, which attributes should be compared and how, and/or the weighted comparison values to dynamically change the calculated distances and, thus, the corresponding search results.

In the particular embodiment described herein as an example, nodes $N_1$, $N_2$, and $N_3$ of the system are the participants of a social network. In the social learning network, definitions of "nearness" that might affect similarity may include attributes related to the participants, such as the participant's age and education level. The below example is by way of an explanation and it should be understood, therefore, that the details below, such as the number of attributes for each participant, should not be limiting. For this example, each participant is defined by a vector with 7 attributes to characterize each node, such that $N=[x_1, x_2, x_3, x_4, x_5, x_6, x_7]$ where $x_1$ represents the age of the corresponding participant; $x_2$ represents the participant's education level; $x_3$, the games played by the participant; $x_4$, the participant's music interest; $x_5$, the amount of time spent online by the participant; $x_6$, the interactive games won by the participant; and $x_7$ represents the number of reading genres studied by the participant. Thus, three exemplary participants within the social learning network of the present example may be identified as:

$N_1$=[40 yrs old, PhD in Chemistry, Go, listens to classical music, online everyday, 5 wins, 3 genres]

$N_2$=[10 yrs old, completed Calculus, Scrabble, plays violin, moderate internet use, 0 wins, 7 genres]

$N_3$=[22 yrs old, Chemistry student, Go, listens to rock music, moderate internet use, 0 wins, 5 genres]

As described above, the attributes are represented as scalar values before comparing the attributes. Attribute values and their scalar translation may be assigned by application software or derived from another data source, such as a semantic network similar to WordNet developed by Princeton University. In this embodiment, all of the words in a semantic database have been tagged with scalar values that correspond to the semantic relationship between words. Thus, use of a semantic database enables at least in part inferring attributes based on words that are similar or related in meaning. Given our example, we assume lookup of the following values:

| Attribute Position | Attribute | Scalar Values |
|---|---|---|
| $X_1$ | Age | Actual age |
| $X_2$ | Education level | Bachelor Science = 16 |
| | | Master of Science = 17 |
| | | PhD = 18 |
| | | Math = 100 |
| | | Chemistry = 125 |
| | | English = 50 |
| $X_3$ | Games played | Scrabble = 1 |
| | | Go = 5 |
| | | Chess = 10 |
| | | Chess Master = 20 |
| $X_4$ | Music interest | Listens = 1 |
| | | Plays instrument = 10 |
| | | Classical = 10 |
| | | Non-classical = 5 |
| $X_5$ | Online use | Daily = 5 |
| | | Frequent = 4 |
| | | Moderate = 3 |
| | | Occasional = 2 |
| | | Rarely = 1 |
| | | None = 0 |
| $X_6$ | Wins | Numerical count of number of wins |
| $X_7$ | Genres read | Numerical count of number of difference genres read |

Given the assignment of the above scalar values to the attributes of the current example, nodes $N_1$, $N_2$, and $N_3$ are characterized as follows:

$N_1$=[40, 143, 5, 11, 5, 3]

$N_2$=[10, 100, 1, 20, 3, 0, 7]

$N_3$=[22, 125, 5, 6, 3, 0, 5]

The assignment of values may be dynamically updated by the system based on events, changes in the state of a node or nodes, or other information. For example, if a user's date of birth is part of the user's profile, the system may update the user's age, or may increment the count of games won each time the user wins an interactive game. Additionally, if usage increases or decreases, the system may change the value associated with the user's online usage attribute, or the system may increment the value of the attribute associated with the number of genres read each time the user orders a book of a new genre or participates in a reading project with a new genre.

In one embodiment, the g matrix acts as selection criteria by driving the definition of how close or how far nodes are from each other based, at least in part, upon relative weighting or importance for a particular objective. g is a contextually relevant expression to select and define similarity within the context of a specific project or activity that is either specified by a user or generated passively. In the current examples set forth below, the similarity between nodes $N_1$, $N_2$, and $N_3$ is calculated within the context of two objectives: (1) finding a "good" partner for an online chess game, where "good" indicates that the opponent is likely to provide a competitive match, and (2) finding $N_2$ the best mentor for a science fair.

Given the attributes that characterize the nodes, we may weight the relative importance of the attributes as follows in order to find a good chess game partner:

| Specific g coefficient | Attribute | Weight |
|---|---|---|
| $g_{11}$ | Age | 2 |
| $g_{22}$ | Education level | 4 |
| $g_{33}$ | Games played | 10 |
| $g_{44}$ | Music preferences | 3 |
| $g_{55}$ | Online usage | 10 |
| $g_{66}$ | Wins | 10 |
| $g_{77}$ | Genres | 0 |

It should be understood that, for the above g matrix, the comparison of non-identical attributes (e.g., the comparison of the age of $N_1$ to the games played by $N_2$) is unimportant for the current objectives and, thus, the corresponding specific g coefficients, such as $g_{12}$, for the weight of non-identical attribute comparisons have been provided a value of zero (0), thereby removing these comparisons from the analysis for the current example, but it should also be understood that such comparisons may be relevant in certain circumstances and, thus, those comparisons may be weighted by providing a positive value for the corresponding g coefficient.

Based on the above exemplary g matrix, the equation described above used to identify the similarities between two nodes produces the following distances between each node:

| | $N_1$ | $N_2$ | $N_3$ |
|---|---|---|---|
| $N_1$ | 0 | 31.4 | 15.2 |
| $N_2$ | 31.4 | 0 | 18.8 |
| $N_3$ | 15.2 | 18.8 | 0 | thereby indicating that nodes $N_1$ and $N_3$ are the most similar and would therefore make the best match with respect to a chess game.

Alternatively, when finding the best mentor for N2 for the science fair, a possible weighting of the importance of the characteristics of the nodes may be:

| Specific g coefficient | Attribute | Weight |
| --- | --- | --- |
| $g_{11}$ | Age | 10 |
| $g_{22}$ | Education level | 8 |
| $g_{33}$ | Games played | 3 |
| $g_{44}$ | Music preferences | 1 |
| $g_{55}$ | Online usage | 3 |
| $g_{66}$ | Wins | 0 |
| $g_{77}$ | Genres | 0 |

This g matrix indicates that age and education level are important factors and, thus, provided a greater weight, while the number of online games won and the number of different genres of books read are unimportant factors and, thus, given a weight of zero (0), thereby removing these attributes from the analysis for the current objective. The results of the distances between the nodes for this objective are:

|  | $N_1$ | $N_2$ | $N_3$ |
| --- | --- | --- | --- |
| $N_1$ | 0 | 48.9 | 24.2 |
| $N_2$ | 48.9 | 0 | 25.9 |
| $N_3$ | 24.2 | 25.9 | 0 | thereby indicating that the closest node to $N_2$ is $N_3$. The only attribute where $N_1$ is closer to $N_2$ is that for music. If a g coefficient was defined that provided a greater weight for the interest in music attribute when selecting a mentor, the result could change.

Both of the above examples demonstrate the system's ability to infer similarity in the absence of any exact match of "selection" criteria and to express the differences between members of a set, rather than a simple ranking of results. For example, if two nodes communicate frequently, the system may infer that the nodes "know" each other and are close to each other. As a result, the system may create a "basis" for inferring by, for example, comparing attributes the nodes' attributes. This allows the system to generate probabilities and inferences based on large-scale analysis of attributes, comparison between nodes, and downstream seeding and ultimately testing of inferences.

Prior to determining the distances between the relevant nodes, the desired nodes must be selected from the network. In the above examples, the relevant nodes were the only nodes within the corresponding network, thereby making their selection simple. Specific nodes may be chosen, however, based on one or more selected attributes, such that execution of a query identifies nodes that have similar values for the one or more attributes. Once these nodes have been identified, the distance between each pair of nodes may be calculated for a given objective based on the above process. Alternatively, the process described above may be used to identify similarly-situated nodes under certain circumstances, chose the identified nodes, or a subset of the nodes, based on their relative proximity, and use the chosen nodes for further distance calculations based on another or other objectives. These groups of selected nodes may be referred to as a cluster of nodes, which merely denotes that a set of nodes have been chosen for some reason.

FIG. 1 illustrates an exemplary system configured to manage connections between nodes within a network connected by a structure, such as wide area network, specifically, the Internet, where the network is a learning community and the nodes are the community's participants.

Time in the synchronization is defined fundamentally by the stage in a project or activity of the participants in the social learning network. As in all definitions of time, the social learning network goes through a learning process, which includes progressions during which participants go through sequences of independent and interdependent actions at superimposed scales. The definition of time and the position of a node are based on the time attribute or attributes in the vector that characterizes that node. The attribute defining "time" for that node or the attributes related to time for each node may be used to calculate how close nodes are to the same "time" and then synchronize their activity or information based on that similarity using the process described above.

The system thus includes a synchronizer that can transform the time definition for a participant in the social learning network into Universal Time, and coordinate groups of participants who are operating in their own context based on different factors, including the relative time of each node. When an event occurs, i.e., a state change or transition, affecting a node or nodes, the relevant attribute or attributes of the node are updated, and their similarity to other nodes in the group are reevaluated. Attributes or events may change based on interaction with, or attributes of, nodes unrelated to the current definition of a group or the group's project. Therefore, the system monitors which participants or sub-networks are nearest one another and are, therefore, candidates for discovery and clustering based on their similarities or differences. The coordinated nodes each have a vector of dynamic attributes that are not necessarily predefined, but which can be dynamically defined based on a particular set of attributes specific to a learning activity, such as writing about a book; that is, choosing the set of x's (attributes) and the value of the g's (the weight of the comparison of the attributes) in the equation above.

Once node clusters of similarity are identified, the system targets information to those nodes. Information includes a notification that each node is part of a particular cluster and may include content, as well as links to additional content, that is related to the focus of the cluster. The system may also receive information from each node that changes the node's attributes and, thus, the current clustering.

In the particular embodiment where the reading of books by mentors and students is the type of learning activity involved, the following activities exist and are synchronized according to the present method. For the purposes of the description of this example, mentors and students may also be referred to as pen pals. The simultaneity of participation between all of the nodes helps provide a rich and unique experience for each student who is communicating, generally in writing, with a mentor or "pen pal" about the subject matter of a jointly-read book. For example, the Genre Synchronization portion of the system coordinates nodes reading in the same genre, while the Pen Pal Pairs Synchronization portion of the system coordinates nodes according to the actual timing of the delivery of letters from pen pals to students. The Individual Pen Pal Synchronization portion of the system reflects the particular interests and activities of a specific pen pal, while the Community Synchronization portion of the system provides an ongoing assortment of community related activities that may or may not be related to the genre or to the pen pal's activity, but by other measures of similarity between users participating in the same type of project.

Genre Synchronization

All participants may follow the same genre sequence so there will be a set of genre-related information and activities that each participant is offered when they reach a particular point in the learning activity. For example, a week after a pen pal receives a book to read, the system operator portion of the method reminds the pen pal to check out an "About the Book" webpage which provides in-depth information about the current genre in the exemplary embodiment. As another example, when a student is waiting for their pen pal's letter, the student may be asked to participate in a genre-related field trip.

Pen Pal Pair Synchronization

Each pen pal pair will have its own schedule, and individual interaction will flow according to the book selection dates, the reading of the book, and the transfer and receipt of letters between the pen pal and student. Each pen pal pair interaction may take a different amount of time. The information available each time a user accesses the system will be unique because the system reflects the where a pen pal or the related student is in the learning process, as well as what activities and resources are relevant to the next interaction that is planned with respect to the student's pen pal.

Individual Pen Pal Synchronization

Although it is similar to the Pen Pal Pair Synchronization portion of the system, the Individual Pen Pal Synchronization portion of the system will also include items and activities that reflect the individual pen pal's experiences and interests. For example, if the pen pal regularly completes crossword puzzles, the pen pal may be invited to participate in a cross-community crossword challenge. The system is configured to discover all other similarly-situated pen pals (e.g., same genre, role, stage in the pen pal writing process, interest in crossword puzzles, etc.) and "synchronize" their participation, by using the method described above in one embodiment.

Community Synchronization

The Community Synchronization portion of the system constantly changes and encourages participants to interact with the community. This portion includes polls, contests, information feeds, and other multimedia and content. Using the methods of discovery and synchronization set forth above, the system is configured to deliver information or opportunities for interaction based on either individual attributes or clustering of similar people, or nodes.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of delivering a dynamic, process-based learning experience for users in a network environment, comprising the steps of:

defining such a structured network environment having multiple nodes wherein the nodes each have a vector of dynamic attributes;

identifying relative positions for multiple nodes within the structured network environment based on a comparison of attributes associated with each of the multiple nodes, wherein the attributes are interests of, or activities participated in by, the multiple nodes, and measuring a distance between the multiple nodes based on a degree of similarity between the dynamic attributes of the multiple nodes and not based on a connected or not state;

clustering the multiple nodes based on the identified relative positions of the multiple nodes and allowing at least some of the multiple nodes to discover others of the multiple nodes;

synchronizing an activity of the multiple nodes based on the relative positions and the degree of similarity between the dynamic attributes of the multiple nodes, wherein the identification of the relative positions and the synchronization are performed without reference to the actual time;

managing state transitions between the multiple nodes based on information received from another of the multiple nodes indicating a change in a dynamic attribute of the node; and serving content or information to the clustered multiple nodes based on the positions and on managed state transitions between the multiple nodes.

2. The method of claim 1 further comprising re-synchronizing the activity of multiple nodes to allow for changes in the relative positions of the nodes and then serving events based on the re-synchronization.

3. The method of claim 1 wherein the identification of relative positions for multiple nodes occurs continuously to allow for re-synchronization.

4. A method for synchronizing nodes on a network wherein each node has a vector of dynamic attributes, said method comprising the steps of:

a. defining a structured network environment having multiple interdependent nodes;

b. identifying relative positions for multiple interdependent nodes within the structured network environment and measuring a distance between the multiple interdependent nodes based on a degree of similarity between the dynamic attributes of the nodes and not based on a connected or not state;

c. synchronizing the multiple nodes based on the relative positions based on a stage associated with each of the multiple nodes and the degree of similarity between the dynamic attributes of the nodes, wherein the identification of the relative positions and the synchronization are performed without reference to actual time;

d. allowing at least one of the relative positions for at least one of the multiple interdependent nodes to change, thereby causing at least one of the relative positions for one of the other multiple interdependent nodes to also change; and e. managing state transitions between the multiple interdependent nodes based on information received from another of the multiple interdependent nodes indicating a change in a dynamic attribute of the node; and f. serving events to the synchronized multiple nodes based on the positions and the managed state transitions.

5. The method of claim 4 wherein at least one first selected interdependent node cannot change at least one second selected interdependent node.

6. A method for synchronizing nodes on a network wherein the nodes each have a vector of dynamic attributes, said method comprising the steps of:

a. collecting event information from multiple node locations;
b. deriving a structured network environment from the collected information;
c. associating multiple nodes within the structured network environment by measuring a distance between the nodes based on a degree of similarity between the dynamic attributes of the nodes and not based on a connected or not state and wherein the associating is performed without reference to actual time;
d. managing state transitions between the multiple nodes based on information received from another of the multiple nodes indicating a change in a dynamic attribute of the node; and
e. serving one or more events to the multiple associated nodes based on the managed state transitions.

7. The method of claim 6 further comprising the step of creating a community of multiple nodes based on at least one of the events served.

8. The method of claim 6 further comprising the step of creating a community of multiple nodes based on participation in an event served.

9. The method of claim 6 further comprising calculating a relative distance between the nodes based on a set of attributes corresponding to the nodes.

\* \* \* \* \*